(No Model.)

J. A. WILDE.
EXPANDING MANDREL.

No. 246,846. Patented Sept. 6, 1881.

WITNESSES:
Chas. Nida
C. Sedgwick

INVENTOR:
J. A. Wilde
BY Munn & Co
ATTORNEYS.

UNITED STATES PATENT OFFICE.

JOHN A. WILDE, OF HUDSON, NEW YORK.

EXPANDING MANDREL.

SPECIFICATION forming part of Letters Patent No. 246,846, dated September 6, 1881.

Application filed May 20, 1881. (No model.)

*To all whom it may concern:*

Be it known that I, JOHN A. WILDE, of Hudson, Columbia county, New York, have invented a new and Improved Expanding Mandrel, of which the following is a specification.

The object of my invention is to provide a new and improved expanding mandrel that will hold the work firmly and truly, even under great pressure of the tool.

The invention consists of a longitudinally ribbed and split sleeve, which is driven into the work and onto a tapered mandrel.

Figure 1:
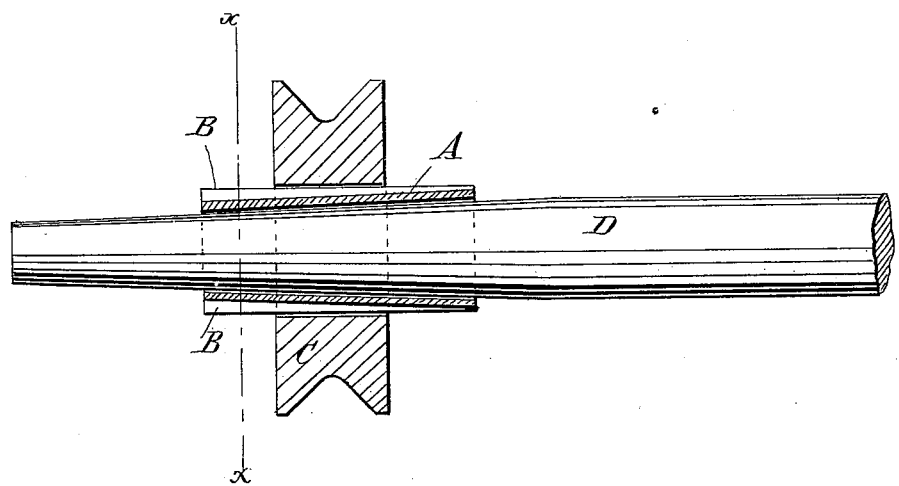
Figure 2:
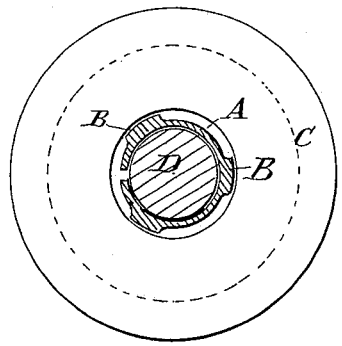
Figure 3:
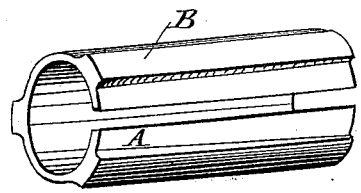

In the drawings, Figure 1 is a longitudinal sectional elevation of my improved expanding mandrel. Fig. 2 is a cross-sectional elevation of the same. Fig. 3 is a perspective view of the split and ribbed sleeve of my improved mandrel.

Similar letters of reference indicate corresponding parts.

The beveled sleeve A is split longitudinally, and is provided with longitudinal ribs or feathers B, which, however, are not beveled on the upper surface, but fit in a true cylinder. The sleeve or chuck A is driven into or through the work C, as shown in Fig. 1, and is mounted or driven on a mandrel, D, until the sleeve is firmly wedged on the mandrel. As the sleeve or chuck A is driven into the work until it is jammed firmly in the same it is evident that the work will be held truly and firmly on the mandrel.

I am aware that a ribbed and grooved chuck or sleeve has been combined with a wedge; also, that a tapered cut ring has been feathered to a tapered mandrel, but not provided with outer ribs; and, also, that a divided spring-shell has been combined with a tapering mandrel, but without ribs to connect with the piece to be rotated.

What I claim as new and of my invention is—

The longitudinally-slit chuck or sleeve A, having the longitudinal ribs B on the outer side, said sleeve and its ribs being tapered in opposite directions, to adapt it to be used as described.

JOHN ALLEN WILDE.

Witnesses:
P. G. HOLLENBECK,
F. H. WEBB.